Oct. 8, 1940.    J. S. FARMER    2,216,971
PORTABLE CIRCULAR SAW
Filed May 10, 1937    3 Sheets-Sheet 1
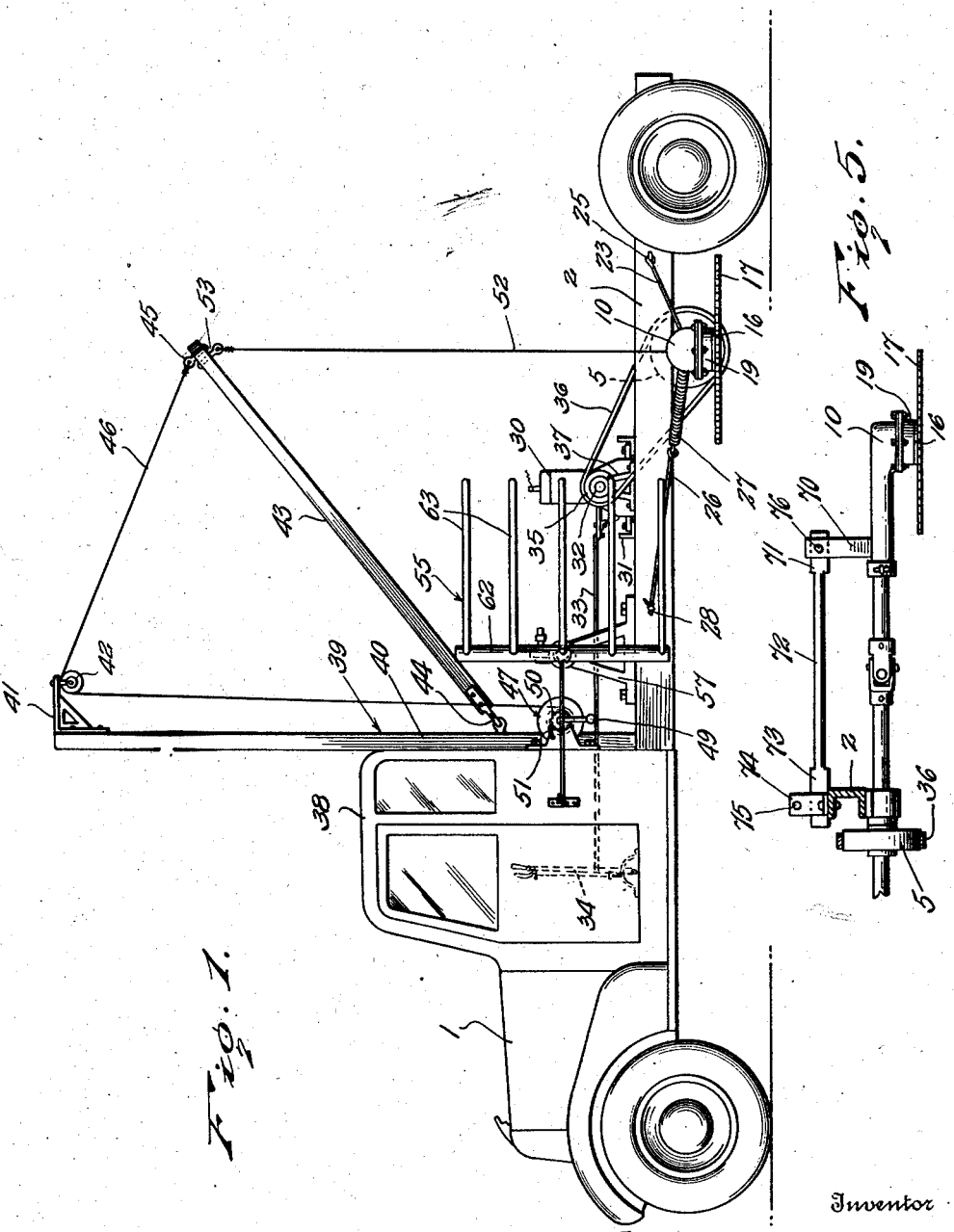
Inventor
J. S. Farmer.
By Lacey & Lacey,
Attorneys

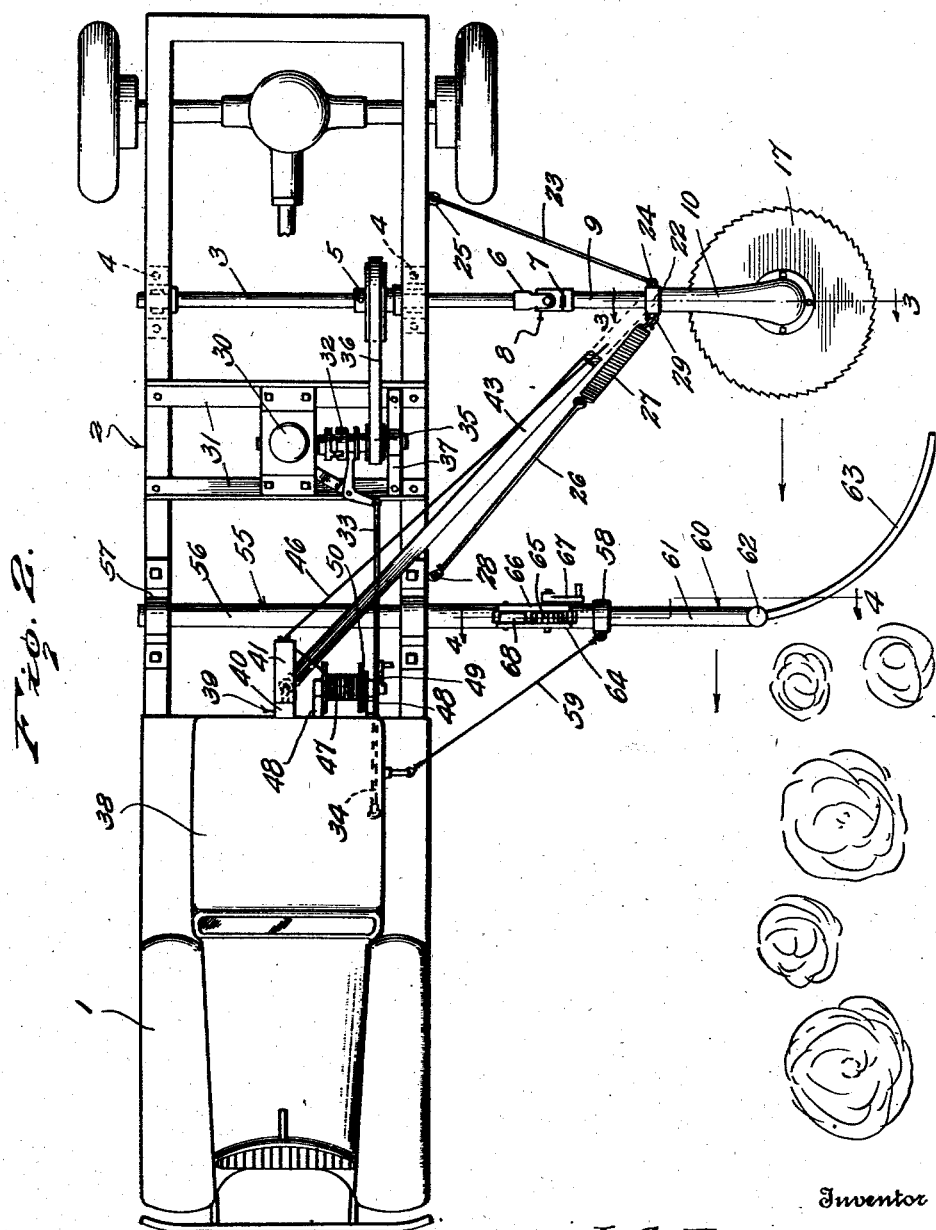

Oct. 8, 1940.                J. S. FARMER                2,216,971
                          PORTABLE CIRCULAR SAW
                          Filed May 10, 1937              3 Sheets-Sheet 3
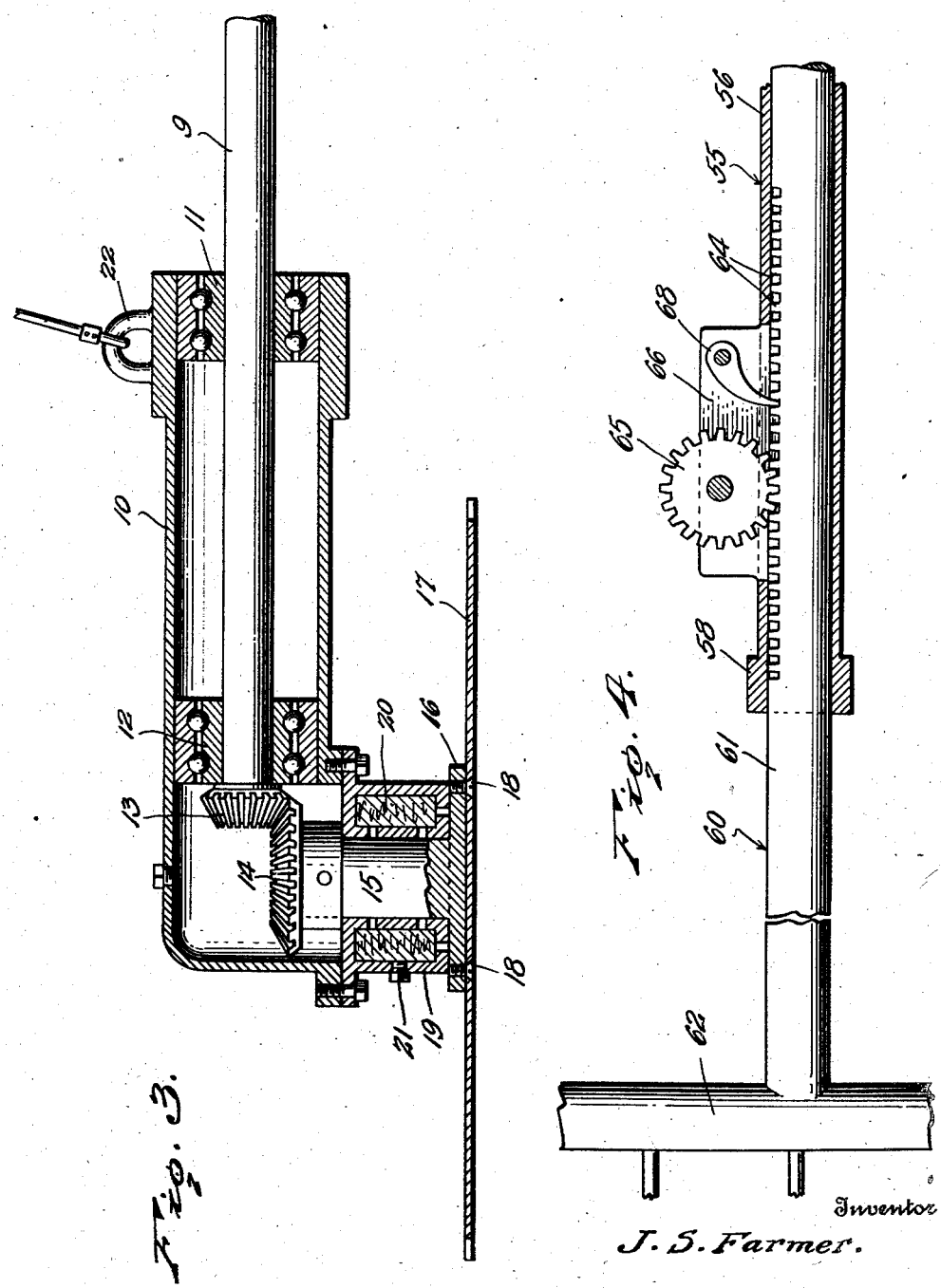

Patented Oct. 8, 1940

2,216,971

UNITED STATES PATENT OFFICE 2,216,971

PORTABLE CIRCULAR SAW

Joseph S. Farmer, Junction, Tex.

Application May 10, 1937, Serial No. 141,775

2 Claims. (Cl. 143—157)

This invention relates to an improved portable circular saw adapted to be transported on a truck, tractor, automobile chassis, or the like.

The invention seeks, among other objects, to provide a circular saw which may be rapidly transported from place to place and which will be particularly effective for cleaning out underbrush, trees, cactus, and the like.

Another object of the invention is to provide a circular saw which is so constructed as to permit the felling of trees of substantial size without the necessity of stopping the vehicle carrying the saw.

A further object of the invention is to provide a device of this character which will embody means for preventing the saw blade employed from becoming broken by pinching contact of said saw blade or disc by leaning timber.

And a still further object of the invention is to provide a circular saw which is adapted to be motor driven and is capable of being shifted upwardly or downwardly.

Other and incidental objects of the invention, not specifically mentioned in the foregoing, will render themselves apparent during the course of the following description.

My invention is illustrated in the accompanying drawings, wherein:

Figure 1 is a side elevation showing my improved circular saw as it would appear properly mounted on a truck chassis.

Figure 2 is a top plan view of my improved circular saw.

Figure 3 is a horizontal sectional view on the line 3—3 of Figure 2, looking in the direction indicated by the arrows.

Figure 4 is an enlarged detail fragmentary sectional view on the line 4—4 of Figure 2, looking in the direction indicated by the arrows.

Figure 5 is a fragmentary plan view showing a slightly modified mounting means for the saw.

Referring now more particularly to the drawings, wherein like numerals of reference designate like parts throughout the various views, the numeral 1 indicates in general a motor vehicle or truck which is provided with a rear deck or chassis 2.

In carrying my invention into effect, I employ a drive shaft 3 which is mounted transversely of the chassis 2 and is supported by depending bearings 4. The drive shaft 3 has a relatively large drive pulley 5 thereon and said drive pulley is located within the confines of the chassis.

The drive shaft 3 is adapted to project laterally outwardly from the rear deck or chassis at right angles to its length and terminates in a universal joint member 6 which cooperates with a second universal joint member 7 to define a universal joint 8. The member 7 is connected with a stub drive shaft 9 which is adapted to project into a housing 10. As best seen in Figure 3 of the drawings, the housing 10 is of substantially unitary construction, being formed of preferably cast metal. The housing 10 carries bearings 11 and 12 which journal the inner end portions of the stub drive shaft. At its inner end the stub drive shaft terminates in a bevel gear 13. The bevel gear 13 is adapted to mesh with a second relatively large bevel gear 14, carried in the housing and mounted on a saw hub 15. The saw hub terminates in a flange 16 to which is bolted a flat saw disc or blade 17 by means of countersunk screws 18. The saw hub is surrounded by a packing gland 19 adapted to receive grease, indicated at 20, through an inlet opening closed by a plug 21. The housing 10 is provided, at its inner end adjacent the bearing 11, with an integral eye 22, the purpose of which will be described in more detail hereinafter.

It will be seen that, as the drive shaft 3 is rotated, rotative movement will be transmitted through the universal joint 8 to the stub drive shaft 9 and through the bevel gears 13 and 14 to the saw blade 17 so that said saw blade or disc will be effectively rotated. The saw blade or disc 17 will normally be disposed horizontally so that, as the truck 1 moves along, the disc may be engaged with trees or underbrush for cutting the same close to the ground or at any desired height.

In order to permit the saw disc assembly and housing to move in a horizontal direction for permitting the saw to be pulled forwardly into timber or underbrush to be cut while the vehicle 1 is standing still, I provide a flexible wire cable 23 which has one end secured to the housing 10 by means of an eye 24. The other end of the flexible wire cable is secured to an eye 25 located on one side of the chassis near the rear end thereof. A second flexible wire cable 26 has one end connected to a retractile spring 27. The other end of the second flexible wire cable is secured to an eye 28 on the chassis, at the same side thereof as the eye 25, and near the substantial mid-portion thereof. The outer end of the retractile spring 27 is connected to an eye 29 on the housing 10. The retractile spring 27 provides a cushioning effect and thus prevents the saw from being pulled too rapidly into the timber. Moreover, the spring 27 is particularly useful in protecting the blade when felling small timber while the truck 1 is in motion.

In order to drive the pulley 5, I provide a gasoline or electric motor 30 which is mounted on spaced cross beams 31 on the chassis 2. The motor 30 is provided with suitable clutch mechanism 32 which may be controlled by a clutch rod 33 and a lever 34 for engaging and disengaging the motor with a drive pulley 35. The drive pulley 35 is rotatably connected with the drive pulley 5 by means of a belt 36. A bearing 37 supports the drive pulley 35 and said bearing is mounted on the cross beams 31 adjacent the chassis 2. The motor 30 will be, preferably, of twenty horse power. It should be understood, that the motor may be of any suitable horse power, depending upon the size of timber to be cut. Moreover, the disc 17 may vary in size to suit conditions. Although I have stated that a gasoline or electric motor is provided, suitable means may be employed for deriving the rotative motion for the saw disc from the motor of the truck 1 through the conventional transmission thereof.

The manner of mounting the saw disc or blade 17 and housing 10 therefor, to permit horizontal movement thereof, has been described hereinabove. From time to time it will be necessary, when operating the truck over stony ground or on hill sides, to raise or lower the saw disc 17 and assembly 10. In order to permit this raising and lowering operation, I provide a crane which is, as best seen in Figure 1 of the drawings, mounted directly behind the cab 38 of the truck. The crane is indicated in general by the numeral 39 and includes an upright bar 40 which is disposed adjacent the cab throughout substantially half the length of said bar and is firmly secured at its lower end to the inner end of the rear deck or chassis 2. The bar 40 includes a bracket 41 carrying a pulley 42. A lifting arm 43 is carried by the crane and has its inner end pivotally connected to the upright bar 40 near its lower end portion by means of inter-engaging eyes 44. The lifting arm 43 carries an eye 45 at one side of its free end portion and said eye is adapted to have engaged therein the free end of a lifting cable 46. As best seen in Figures 1 and 2 of the drawings, the lifting cable 46 is trained about a drum 47 which is mounted in brackets 48 disposed on the rear wall of the cab 38. The drum is provided with a handle 49 and a ratchet wheel 50, said handle being rotatable for winding or unwinding the lifting cable 46 on the drum. The ratchet wheel 50 has a pulley 51 engaged therewith for retaining the drum in a desired set position.

The lifting cable 46 is led upwardly along the upright bar 40, trained about the pulley 42 and connected with the eye 45. It will now be understood that as the drum 47 is rotated for winding or unwinding the lifting cable 46, the lifting arm 43 will be raised or lowered, as the case may be. A suitable supporting cable 52 connects the integral eye 22 with an eye 53 carried on the under side of the free end portion of the lifting arm 43. Raising and lowering of the arm 43, as will now be understood, effects raising and lowering of the housing 10, with the saw disc assembly thereon, so that the height of said saw disc may be readily regulated to suit conditions. Moreover, lowering of the disc will permit the cutting of timber as close to the ground as possible so that high stumps will not be left.

In order to prevent pinching of the saw disc by leaning timbers and to prevent trees and the like from falling onto the cables, drive shafts and other parts, I provide a protecting or pushing arm which is indicated in general by the numeral 55. The pushing arm 55 embodies a tubular housing 56 which is adapted to extend transversely of the chassis, near the mid-portion thereof, and is adapted to be supported by mounting clips or members 57. The tubular housing 56 is adapted to extend laterally outwardly from the chassis in parallel spaced relation to the drive shafts 3 and 9 and terminates in an integral collar 58. The collar 58 is connected to the truck, near the cab thereof, by means of a guy cable 59 so that the possibility of longitudinal rearward swinging movement of the outer end of the tubular housing will be prevented.

As best seen in Figures 1, 2 and 4, the pushing arm includes an extensible arm member 60 which has a shank 61 extending into the housing 56. The shank 61 terminates in a vertically disposed arm 62 and secured to said arm 62 are laterally projecting vertically spaced protecting elements 63 which are slightly curved longitudinally and rearwardly toward their free ends. As best seen in Figure 1, the pushing arm 55 is normally disposed slightly above and forwardly of the saw disc so that the saw assembly will be effectually protected from falling trees and underbrush. Moreover, the pushing arm 55 will assist in permitting the saw disc to project beneath low hanging limbs into engagement with the trunks of trees to be cut. When it is desired to exert more force on an overhanging limb or other object in the path of the saw disc, the pushing arm 55 may be extended a suitable distance in the following manner. By referring to Fig. 4 of the drawings, it will be seen that I have provided rack teeth 64 on the shank 61. These rack teeth are adapted to be engaged by a toothed wheel or gear 65 which is mounted on a yoke 66 formed integrally on the tubular housing 56 near its free end. The yoke 66, of course, defines an open slot through which the teeth of the gear 65 project for engagement with the rack teeth 64 on the shank 61. The gear 65 is rotated by a handle 67 when it is desired to advance or retract the arm member 60. The shank 61 is held in a desired position by means of a pawl tooth 68.

While it is believed that a reading of the foregoing description will render the manner of operation of the present invention entirely clear, a further statement is thought not to be out of order and here follows:

The truck is driven to the location where it is desired to remove timber or underbrush, such as mountain cedar, cactus, prickly pear, or the like, and the truck is then driven alongside the material to be cut for engaging the disc 17 therewith. The disc is, as previously described, rotated at a suitable rate of speed by the motor 30 and said disc will effectually cut the timber or underbrush as the truck moves slowly along. It will not be necessary to stop the truck unless trees having extremely thick trunks are encountered. The spring 27 cushions the contact of the disc 17 so that undue wear thereon is avoided. Moreover, if there is encountered an extremely heavy growth of underbrush or timber and it is desired to stop the truck, this may be done and the saw disc assembly shifted horizontally for engaging the disc with the underbrush or timber and permitting cutting thereof. The pushing arm 55, as previously described, will effectually prevent injury to the saw disc which might be caused by pinching thereof or other contact.

Raising and lowering of the saw disc may be accomplished by manipulating the crane. Although it would appear to be obvious, it is desired to state that the saw blade or disc may be shifted so as to cut in a vertical plane as well as in a horizontal plane. Moreover, a suitable bell housing to protect the universal joint 8 may be embodied.

Referring now to the modification of the invention as shown in Figure 5 of the drawings, the numeral 70 indicates an upstanding yoke which is carried on the housing 10. The yoke is adapted to receive a squared end portion 71 of a brace rod 72. The brace rod 72 has its opposite end enlarged and squared at 73 and said squared portion is slidably received in a relatively small yoke 74 which is mounted on the frame or chassis 2. A pin 75 limits upward movement of the brace rod 72 while a bolt 76 extends through the squared portion 71 and pivotally mounts one end of the brace rod 72. The purpose of the brace rod with its squared end portion is to prevent rocking or canting of the saw disc 17 as the saw is being moved into engagement with the work. It will be seen that inasmuch as the enlarged squared portion 73 is slidable through the relatively small yoke 74, vertical shifting movement of the housing on the universal joint may take place. The relatively small yoke 74 is pivotally mounted on the chassis 2 so that horizontal movement of the saw housing in every direction will not be interfered with.

In order to provide a substantially uniform speed of rotation for the saw disc, irrespective of minor speed variations in the motor, a heavy flywheel may be mounted on the drive shaft 3. Moreover, a clutch may be mounted on the drive shaft to prevent breaking of the saw disc or any of the other elements in the event said disc becomes jammed.

In practice, it has been found that the cutting speed of this machine under average conditions will equal the labor of twenty men equipped with axes. Moreover, inasmuch as the bolts holding the disc 17 to the flange 16 are countersunk, the disc will be permitted to slide freely over stumps after cutting so that impediment to the saw disc by said stumps will not take place.

It is believed that further explanation is unnecessary and that it will be understood that I have provided a highly efficient portable circular saw which may be operated with great facility.

Having thus described the invention, what I claim is:

1. In a portable circular saw attachment, a pushing arm including a housing formed with a yoke near its outer end, said yoke defining a slot, a gear carried within the yoke and projecting into the slot, an arm member carried by the housing and being adapted for sliding movement therein, said arm member having rack teeth for engagement by the gear, a handle manually operable for rotating the gear and effecting advance and withdrawal of the arm member within the housing, a pawl tooth carried by the yoke and adapted for selective engagement with the rack teeth whereby the arm member may be retained in a desired set position, a vertical arm carried by the arm member at its free end, and laterally extending vertically spaced protecting elements carried by the vertical arm.

2. In a portable circular saw attachment, a pushing arm including a tubular housing, said tubular housing being formed with a yoke near its outer end, said yoke defining a slot, a gear carried within the yoke and projecting into the slot, an arm member carried by the housing and being adapted for sliding movement therein, said arm member having rack teeth for engagement by the gear, a handle manually operable for rotating the gear and effecting advance and withdrawal of the arm member within the housing, a pawl tooth carried by the yoke and adapted for selective engagement with the rack teeth whereby the arm member may be retained in a desired set position, a vertical arm carried by the arm member at its free end, and a protecting element carried by the vertical arm, said protecting element being curved longitudinally.

JOSEPH S. FARMER.